United States Patent Office 2,723,976
Patented Nov. 15, 1955

2,723,976

2-AMINO-4-CYCLOHEXYLAMINO-5-BENZYLPYRIMIDINE

Aaron S. Goldberg, New York, N. Y., assignor to Nepera Chemical Co., Inc., Yonkers, N. Y., a corporation of New York No Drawing. Application April 3, 1952, Serial No. 280,395

1 Claim. (Cl. 260—256.4)

This invention relates to the preparation of certain novel pyrimidine compounds and relates more particularly to the production of novel 2-amino-4-substituted-amino-5-benzylpyrimidine compounds.

Compounds containing a pyrimidine nucleus are of wide pharmacologic interest since compounds containing the basic pyrimidine structure are known to play an important part in physiological processes. Compounds containing the pyrimidine structure are present in the cell nucleus in the form of nucleoproteins. Vitamin B₁, folic acid, and thymine are other important natural substances of pyrimidine structure. Although the study of the physiologically active pyrimidine compounds has occupied the attention of many investigators, the usefulness of many compounds which come within the broad class of pyrimidine compounds has, by no means, been fully determined since it is well known that relatively small changes in the structure of pyrimidine compounds have been found to cause widely different physiological effects.

It is, therefore, an important object of my invention to provide certain novel 2-amino-4-substituted-amino-5-benzylpyrimidine compounds having desirable physiological activity.

Another object of this invention is the production of certain novel physiologically active 2-amino-4-substituted-amino-5-benzylpyrimidine compounds which may be obtained from available or readily synthesized intermediates.

Other objects of this invention will appear from the following detailed description.

The novel pyrimidine compounds of my invention may be represented by the following general formula

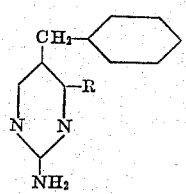

wherein R is a substituted amino group. Thus, for example, R may be an alkylamino group, such as a methylamino, dimethylamino, ethylamino, diethylamino, di-hydroxyethyl-amino, propylamino or other alkylamino group wherein the alkyl group contains up to about six carbon atoms or R may be a cycloalkyl amino group such as a cyclohexylamino group. These compounds have an analeptic action.

The novel compounds of my invention may be prepared, for example, by condensing ethyl hydrocinnamate:

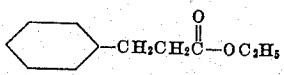

with ethyl formate to obtain the intermediate compound ethyl α-formyl hydrocinnamate

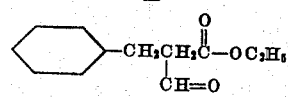

This intermediate may then be reacted with guanidine,

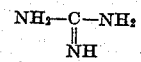

to yield 2-amino-4-hydroxy-5-benzylpyrimidine.

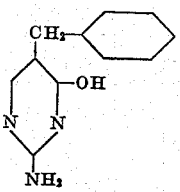

Reaction of the above compound with phosphorus oxychloride yields 2-amino-4-chloro-5-benzylpyrimidine and, by reacting the latter compound with a suitable substituted-amine, the novel compounds of my invention may be obtained.

In order further to illustrate my invention, but without being limited thereto, the following examples are given:

Example I 67 parts by weight of sodium metal and 2 parts by weight of potassium metal are placed in a reaction vessel, sufficient toluene added to cover the metal and the mixture then heated with some agitation until the sodium and potassium are melted. The toluent is then decanted from the molten alloy and a mixture of 375 parts by weight of ethyl hydrocinnamate, 350 parts by weight of ethyl formate and 850 parts by weight of diethyl ether are gradually added to the sodium-potassium alloy. The addition is made under reflux and at a rate sufficient to maintain the exothermic reaction mixture at a lively boil. Hydrogen is given off as a reaction product. When the addition of the ester mixture is completed and the evolution of hydrogen ceases, the reaction mixture is allowed to reflux for a period of about 1 hour. The mixture is poured on to ice, the aqueous phase separated from the ether phase, and, after washing the ether phase once with dilute aqueous sodium hydroxide, the ether phase is discarded. The aqueous sodium hydroxide phases are combined, acidified with cold hydrochloric acid and the combined acidified aqueous phase then extracted with ether. The ether layer is separated and the ether evaporated under reduced pressure. The formyl ester is then distilled under a pressure of 1 mm. or less. A yield of 70% of theory of ethyl-α-formyl hydrocinnamate is obtained as the product.

25 parts by weight of guanidine hydrochloride are dissolved in 66 parts by weight of 30% aqueous sodium hydroxide and the solution obtained is added, with agitation, to 50 parts by weight of ethyl-α-formyl hydrocinnamate. The temperature is maintained at about 60° C. for about 30 minutes after which the temperature is raised to about 85° C. The temperature is held at 85° C. for about one hour and the mixture then heated to boiling at which temperature it is held for about one hour. The reaction mixture is cooled and partially neutralized with hydrochloric acid. The pH is finally brought to be between 7 and 8 by the addition of acetic acid. The reaction mixture is then held at a temperature of 3° C. for 16 hours. The product formed is filtered off, washed with cold water, then with some ether and finally with acetone. A yield of 41% of theory of 2-amino-4-hydroxy-5-benzylpyrimidine is obtained, the crystalline product having a melting point of 240° C.

Example II 10 parts by weight of 2-amino-4-hydroxy-5-benzylpyrimidine are heated with 17 parts by weight of phosphorus oxychloride under reflux. After about thirty minutes solution is complete and heating is then continued for two hours longer. The excess of phosphorus oxychloride is removed under reduced pressure. The reaction mixture is diluted with 40 parts by weight of cold chloroform and the diluted reaction mixture then extracted about three times with ice water. The chloroform layer is then diluted with about one-half of its volume of diethyl ether and an excess of a saturated aqueous solution of sodium bicarbonate added. The product precipitates out at the interface of the aqueous and the organic phases. The product is separated, washed with water and then with diethyl ether. The 2-amino-4-chloro-5-benzylpyrimidine obtained is recrystallized from a mixture of chloroform-diethyl ether. A yield of 60% of theory of 2-amino-4-chloro-5-benzylpyrimidine is obtained, the product melting at 183° C.

Example III 3 parts by weight of 2-amino-4-chloro-5-benzylpyrimidine and 4 parts by weight of absolute ethyl alcohol are heated in an autoclave at 100° C. for 10 hours with 8 parts by weight of a 33% by weight ethyl alcohol solution of dimethylamine. The autoclave is opened and the reaction mixture reheated to about 70° C. Water is then added to complete precipitation and the entire mixture cooled. The crystals formed are separated and washed with water. A yield of 84% of theory of 2-amino-4-dimethylamino-5-benzylpyrimidine is obtained, the crystalline product melting at 185° C.

Example IV

To 1 part by weight of 2-amino-4-chloro-5-benzylpyrimidine is added 2.5 parts by weight of absolute alcohol and 1.9 parts by weight of cyclohexylamine and the reaction mixture heated in an autoclave at 100° C. for five hours. 10 parts by weight of diethyl ether are added to the reaction product and the entire mixture then extracted about four times with water. The ether layer remaining is then dried over anhydrous sodium sulfate and concentrated by removing a portion of the ether. Petroleum ether is then added and crystallization of the product allowed to take place by cooling the mixture at 3° C. for about two hours. A yield of 90% of theory of 2-amino-4-cyclohexylamino-5-benzylpyrimidine is obtained, the product melting at a temperature of 132° C.

It is to be understood that the foregoing detailed description is given merely by way of illustration and that many variations may be made therein without departing from the spirit of my invention.

Having described my invention, what I desire to secure by Letters Patent is:

What I claim is:

2-amino-4-cyclohexylamino-5-benzylpyrimidine.

References Cited in the file of this patent

UNITED STATES PATENTS

| | | |
|---|---|---|
| 2,649,449 | Goldberg | Aug. 18, 1953 |
| 2,691,655 | Hitchings | Oct. 12, 1954 |

OTHER REFERENCES

Falco et al.: Brit. J. Pharm. and Chemotherapy, vol. 6, pp. 188–95 (1951).